United States Patent [19]

Young

[11] 4,061,342
[45] Dec. 6, 1977

[54] TONE ARMS

[76] Inventor: Steven H. Young, 23635 Tiara St., Woodland Hills, Calif. 91367

[21] Appl. No.: 693,718

[22] Filed: June 7, 1976

[51] Int. Cl.² .............................................. G11B 3/10
[52] U.S. Cl. ................................................. 274/23 A
[58] Field of Search ................. 274/23 A, 13 R, 14 R

[56] References Cited

U.S. PATENT DOCUMENTS

| | | | |
|---|---|---|---|
| 2,869,877 | 1/1959 | Bard | 274/23 A |
| 3,046,024 | 7/1962 | Faulkner et al. | 274/23 A |
| 3,361,429 | 1/1968 | Santelli | 274/23 A |
| 3,578,340 | 5/1971 | Fortune | 274/23 A |
| 3,615,096 | 10/1971 | Norris | 274/23 A |

*Primary Examiner*—Richard E. Aegerter
*Assistant Examiner*—John W. Shepperd
*Attorney, Agent, or Firm*—Robert E. Geauque

[57] ABSTRACT

A tone arm which uses a suspension instead of a conventional arm and pivot. It is designed to reduce mass by reducing the physical size of the components of the device. It also provides a suspension that is more compliant than that of the cartridge stylus suspension. Tracking is provided in a straight line eliminating skating force and track error. A linear bearing provides very low friction translation of the carriage on the track.

8 Claims, 6 Drawing Figures

CARRIAGE

CUEING DEVICE

TONE ARMS

BACKGROUND OF THE INVENTION

The advantages of tracking a phono cartridge in a straight line are well known. Elimination of skating force, tracking error, and twisting of the stylus in the record groove, all are common problems of the pivoted tone arm. My improvement of the tone arm is a reduction of the moving mass. This is done by the use of a very complicated suspension instead of a conventional arm. A carriage mounted on a track is used to provide a linear travel across the record. A form of linear ball bearing is used in the carriage to reduce rolling friction between the track and the carriage. The track is designed to manually swing out across the record when playing, then be returned parallel to the record when finished playing.

Record warp causes a wow and flutter sound, amplifier preload, and a constant pumping of the low frequence drivers. The following will explain my improvements in this area:

SUMMARY OF THE INVENTION

My objectives in using a suspension were to obtain a very low moving mass as well as a very compliant guiding mechanism. A much lower moving mass is due to a reduction in size of the suspension parts, thus reducing the G forces on the stylus. The higher mass of conventional arms causes large tracking force changes when tracking record warp.

In following the above requirements, I designed a suspension together with a mass reduction, that will be more compliant than the stylus suspension, thereby allowing the phono cartridge and guiding suspension to move as unit. So the stylus suspension is not deflected to produce a signal that would be sent to the amplifier.

A signal sent to the amplifier in the foregoing manner results in causing three forms of distortion:

A. It preloads the amplifiers with a usually low frequency signal that causes a high power signal along with the music. This reduces the powerband width, or clean undistorted power available from the amplifiers in a stereo system. The amount of band width lost to this problem will vary with amount of record warp.

B. The low frequence driver cones will be moving in long excursion (pumping) which often adds a warbling sound to the music. I might add here that the better the music system is the worse and more annoying this becomes.

C. The low frequence drivers while pumping will also often produce a flapping sound with the music. This is usually only a problem at low listening levels.

Record warp is common. I personally have never seen a record that is perfectly flat. Record warp or warp wow as it is called, is becoming an ever greater problem with the improvement of state of the art components.

My objective with this tone arm is to provide a linear tracking arm that puts less G force on the stylus assembly, as well as a very low friction, low noise, RELIABLE tone arm.

The specific nature of the invention as well as other objects and advantages thereof will clearly appear from a description of a preferred embodiment.

DESCRIPTION OF THE PREFERRED EMBODIMENT

Figure 1:
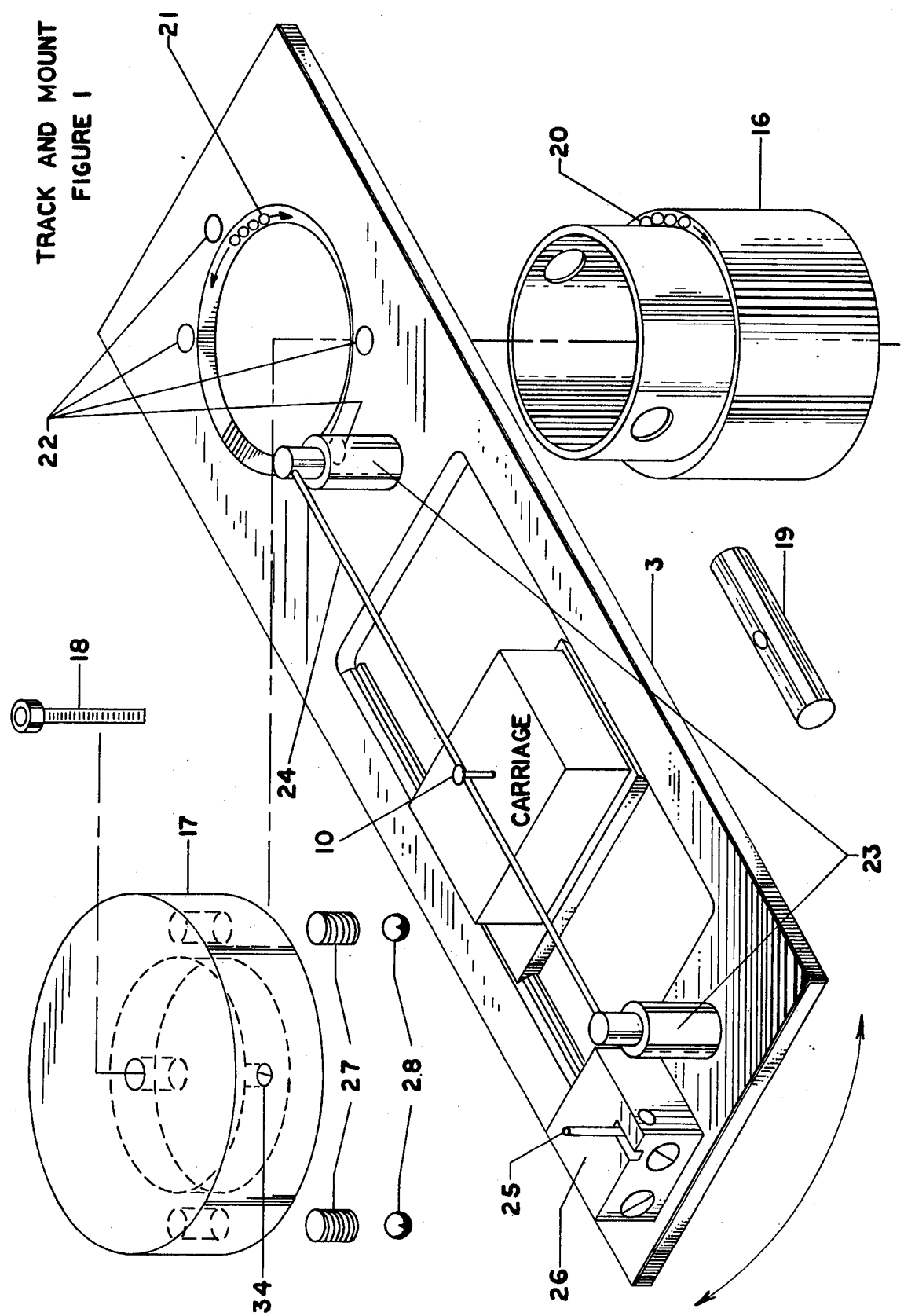

FIG. 1, entitled "Track and Mount" is a plan view of one embodiment of my invention, complete except for the carriage which is shown as a block representation.

Figure 2:
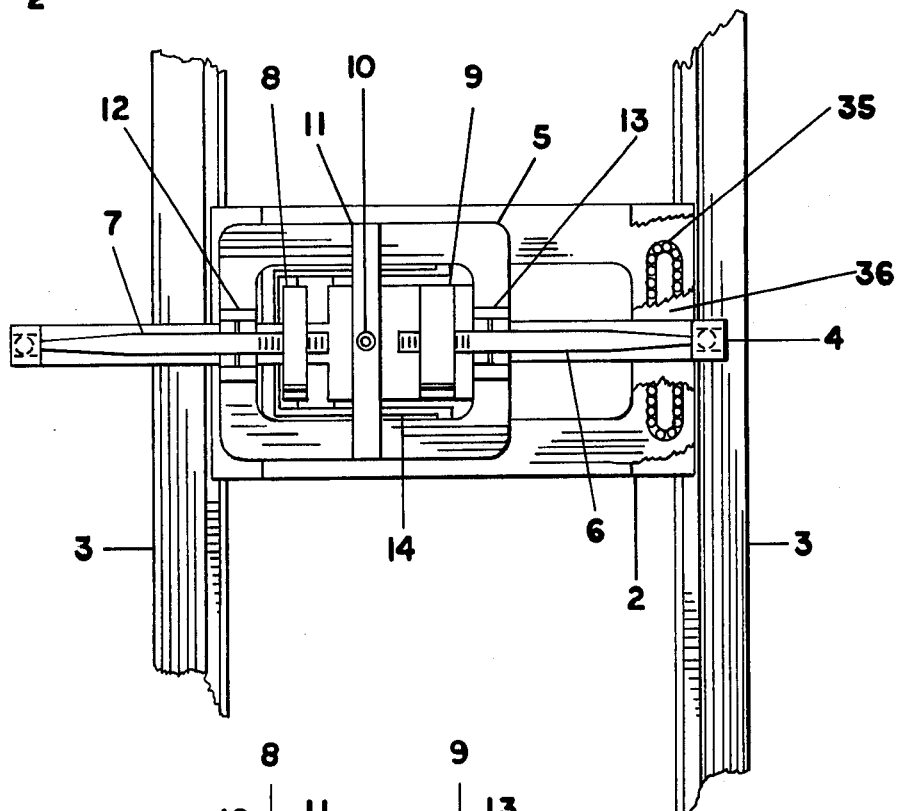
Figure 3:
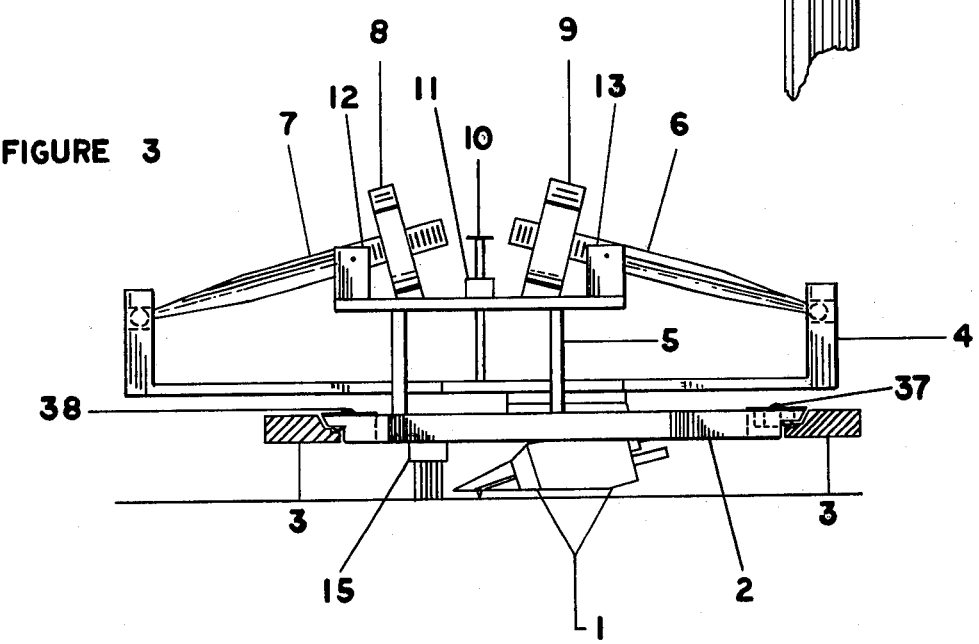

FIGS. 2 & 3, entitled "Carriage" is complete detailed drawing of the carriage.

Figure 4:
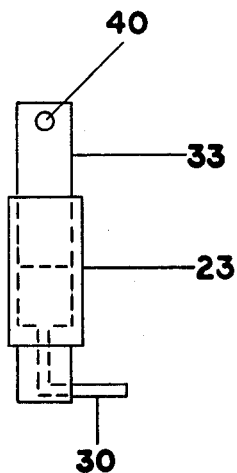
Figure 5:
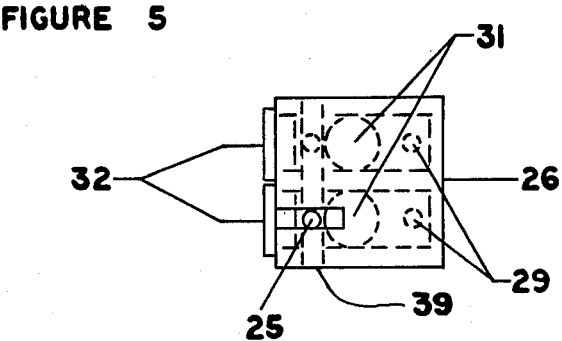
Figure 6:
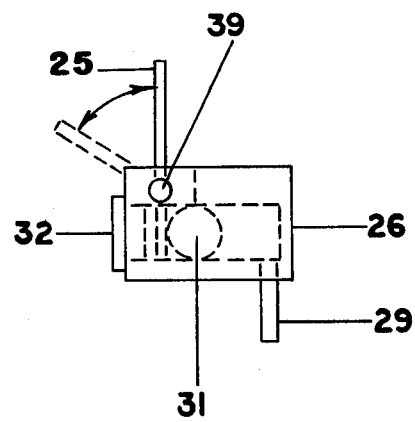

FIGS. 4, 5 & 6, entitled "Cueing Device" is a complete plan of the cueing device and is shown for clarity in different plains.

Referring to FIG. 1 entitled "Track and Mount," the carriage (a block representation) is shown mounted within Track 3. The Track 3 pivots around 16, which has a shoulder with ballbearings 20 to support the track. The Track 3, mount 16 and cap 17 are made of stainless steel. 17, which is the cap, clamps the Track 3 to the base 16. The bearings 20, under, and 21 on top of track 3, ride in raceways that are 45° to the rest of track 3. This provides both horizontal and vertical alignment of the track 3 as it rotates around the base 16. Play in the track 3 mount is adjusted by screw 18 located in the cap 17.

Precision positioning of the track as well as holding of position is accomplished by balls 28 and springs 27 mounted in the under side of the cap 17. These balls 28 fall into dedents 22 to provide and hold the operating and storage positions of the track. The cap is secured and clamps the track by screw 18, which threads into bar 19, which in turn is inserted into mount 16 in the two holes provided. Screw 34 prevents rotation of the cap and adjusts dedent position. The carriage is shown in FIG. 1 as a block representation to show placement. A detail plan is shown on FIGS. 2 and 3 entitled "Carriage."

Linear movement of the carriage is accomplished by a form of linear ball bearing. Balls recircuiting in a closed circuit 35 as shown in FIG. 2. The underside of circuit 35 is cut away on the nearest side parallel track 3. This allows the balls to support the carriage on the track when a top 36 is bolted 37 and 38 to the top of circuit 35. FIG. 3 shows the bolts 37 and 38. There are two circuits of balls supporting opposite ends of the carriage. This provides very low friction, very precise linear movement on the track 3.

A suspension shown in FIGS. 2 and 3 provides precise movement in a vertical plain only as well as a very low mass on FIGS. 2 and 3. Balance arms 6 and 7 along with the counter-balance weights 8 and 9 balance the phono cartridge 1 as well as provide the tracking force. A small diameter telephone type coiled wire carries the phono carriage signal. This is not shown. It supports itself. Guide rod 10 insures that movement of the suspension is precisely vertical through bearing 11. All suspension parts, that is: 4, 6, 7, 8, 9, 10 are all constructed of a very light material such as aluminum. This is very important as it reduces the moving mass and thereby reduces the G forces on the stylus. This is the one critical point not addressed in the prior art.

The balance arms 6 and 7 in FIGS. 2 and 3 are constructed with a ball on the end that supports the cartridge mount 4. The ball ends allow free back and forth movement as the balance arms swing their arc. Pivot mounts 12 and 13 mount the balance arm pivots. 5 is a general support for the suspension. These are also shown in FIGS. 2 and 3.

In setting the arm up with a cartridge, a balance between 6 and 7 is found by adjusting 8 and 9 with the phono cartridge in place so that there is no binding of guide rod 10 in bushing 11. The tracking force is then applied by moving both weights 8 and 9 closer or further from the balance arm pivots 12 and 13. A set of counter balance weights will be necessary to provide a minimum of mass with different phonograph cartridges.

A brush is used to provide drive for the carriage. The brush is mounted on swing arm 14 shown in FIG. 2. The swing arm is pivoted at the center of the carriage body 2. The tip of phono cartridge 1 engages the swing arm 14 as it is lifted from the record. When the brush rests on the record, the bristles fall into the grooves and follow the spiral toward the center of the record. A certain amount of stiffness of the brush bristles is necessary to obtain best results. Experimentation will show how much. The brush is immediately in front of the stylus so that the rate of movement of the stylus and brush are closely the same as they follow the record spiral inward. The brush is less compliant than the stylus suspension, therefore it responds to the groove pitch variation sooner than the stylus suspension. Thus the carriage is translated on the track.

The lifting of the phono cartridge is provided by a hydraulic cueing system. FIGS. 4, 5, and 6 entitled "Cueing Device." This device consists of FIGS. 5 and 6, the actuater 26 and the lifts 23, FIG. 4. The actuater consists of a cueing lever 25 which pushes two ball bearings into two cylinders. 39 is a pivot which runs through both cylinders (FIG. 5) to carry the cueing lever 25's rotation to the second cylinder. Thus both balls 31 are actuated simultaneously. This produces two separate circuits, one for each lift. Two plugs 32 are needed for machining of the cylinders as well as assembly and draining of hydraulic oil. As the oil is displaced from tube 29 it is piped to the lifts. It enters tube 30 (FIG. 4) and displaced piston 33 upward. Hold 40 supports lift rod 24 shown on FIG. 1 track and mount. To lower piston 33 in FIG. 4 is accomplished by moving cueing lever back to a vertical position. This allows the greater weight of the pistons 33 to displace the oil back into the cylinders of the actuater 26. The balls 31 in the actuater are locked all the way forward to tube 29 by the end of the lever arms 25 coming perpendicular to the balls. This locks the phono cartridge up off the record.

I claim:

1. A tone arm assembly adapted for mounting a phonograph cartridge comprising:
    a vertical base member;
    an elongated horizontal support member rotatably mounted on said base and having an elongated opening formed therein and side tracks disposed on opposite sides of said opening; and
    a carriage comprising a suspension support member mounted so as to move freely along said side tracks, a cartridge mount assembly adapted for mounting a phonograph cartridge, a first balance arm pivotably mounted on one side of said suspension support member and coupled to one side of said cartridge mount assembly, a second balance arm pivotably mounted to the other side of said suspension support member and coupled to the other side of said cartridge mount assembly, whereby the cartridge may be balanced by adjustment of said balance arms, and first and second counter balance weights slideably mounted on said first and second arms, respectively, whereby the tracking force applied to said cartridge is selectable by means of said counter balance weights.

2. The tone arm assembly of claim 1 wherein said suspension support member includes a bushing, and a vertical guide rod is mounted on said cartridge mount assembly such that when said cartridge is balanced said vertical guide rod is substantially centered within said bushing.

3. The tone arm assembly of claim 1 wherein said support member is mounted so as to move freely along said side tracks by means of a linear ball bearing arrangement disposed between the lower surface of said support member and said side tracks.

4. The tone arm assembly of claim 1 further comprising a brush, and a swing arm assembly, one end of which is pivotably mounted to the lower surface of said suspension support member and the other end of which carries said brush such that the brush is offset from the stylus by a preselected amount.

5. The tone arm assembly of claim 4 wherein said brush is less compliant than the stylus suspension of the cartridge.

6. The tone arm assembly of claim 1 wherein said cartridge mount assembly, said balance arms and said counter balance weights are aluminum.

7. The tone arm assembly of claim 1 further comprising means for lifting said carriage from said horizontal support member, said means including a hydraulic actuator coupled to two hydraulic lifts and a rod connected between said lifts and mechanically coupled to said carriage, whereby upon actuation of said lifts by said actuators said carriage is lifted from said horizontal support member.

8. The tone arm assembly of claim 7 wherein said actuator comprises at least one cylinder containing hydraulic fluid and having an outlet port disposed near one end of said cylinder, a ball disposed within said cylinder and a cueing lever arranged relative to said ball and said cylinder such that in one position of said lever said ball is pushed toward said one end of the cylinder whereby hydraulic fluid is force from said cylinder, and in another position of said lever said ball is allowed to return to the other end of said cylinder in response to hydraulic fluid returning from said lifts.

* * * * *